(12) United States Patent
Wytenburg

(10) Patent No.: US 9,718,392 B1
(45) Date of Patent: Aug. 1, 2017

(54) FASTENERS TO SECURE VARIOUS FIXTURES TO EXTERIOR OF SHIPPING TRANSPORT CONTAINERS

(71) Applicant: Ries Ignatius Wytenburg, Santa Clara, CA (US)

(72) Inventor: Ries Ignatius Wytenburg, Santa Clara, CA (US)

(*) Notice: Subject to any disclaimer, the term of this patent is extended or adjusted under 35 U.S.C. 154(b) by 0 days.

(21) Appl. No.: 15/091,101

(22) Filed: Apr. 5, 2016

(51) Int. Cl.
*B60P 7/00* (2006.01)
*B60P 7/08* (2006.01)

(52) U.S. Cl.
CPC ................... *B60P 7/0815* (2013.01)

(58) Field of Classification Search
CPC ................................................ B60P 7/0815
USPC ...... 410/32, 33, 46, 68, 80–82, 120; 220/1.5
See application file for complete search history.

(56) References Cited

U.S. PATENT DOCUMENTS 6,210,088 B1 * 4/2001 Crosby ................... B60P 7/132
410/35

* cited by examiner

*Primary Examiner* — Stephen Gordon

(57) ABSTRACT

A fastening device to facilitate the secure and flexible placement of attachment points along a container's structural rails and any points facilitated by a combination of these fasteners, as well as placement adjustments as required during setup or necessitated by after-thought design changes without requiring any modifications to the original container construction or causing any penetrations in the sealed envelope of the container and is therefore removable without leaving any alteration or lasting damage.

1 Claim, 8 Drawing Sheets

FASTENERS TO SECURE VARIOUS FIXTURES TO EXTERIOR OF SHIPPING TRANSPORT CONTAINERS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

This disclosure relates generally to the use of shipping transport containers for other than the original designed purpose of shipping or transport either by land or by sea where secure exterior attachments are desired.

BACKGROUND

More and more often shipping transport containers are being utilized for purposes other than the intended original design, uses such as but not limited to temporary, semi-permanent or permanent storage and/or work/residential structures.

Shipping transport containers, by original purpose design are to house and hold cargo internally for relocation and thus provide no secure means or points (beyond the heavy corner pinning points to secure for ship or truck transporting) to mount or attach any fixtures or equipment externally.

This invention provides an installation method that allows for flexible placement of attachment points along the structural container upper and lower structural members and any points facilitated by a combination of these fasteners, as well as placement adjustments as required during setup or necessitated by after-thought design changes.

In almost all cases it is undesirable to make any perforations in the scaled envelope of the container—especially when the precise position(s) to where and how attachments are evolving is concerned. This invention serves to address these problems efficiently and economically.

SUMMARY

Briefly and in general terms, the present disclosure is directed towards exploiting shipping transport containers for other than their original intended design where a means to secure various external attachments such as, but not limited to signs, storage racks and/or devices, solar arrays and related equipment, tanks, general racking, antenna, etc. to the top, sides and end of shipping transport containers without requiring any modifications to the original container construction or causing any penetrations to the sealed container envelope and is therefore removable without leaving any alteration or lasting damage. This is very beneficial in the case of term rentals of the containers.

Other features and advantages of the present disclosure will become apparent from the following detailed description, taken in conjunction with the accompanying drawings, which illustrate, by way of example, the principles of the disclosed embodiments

DETAILED DESCRIPTION

A generic shipping transport container and its structural features are described as they relate to the invention. In the following description, numerous specific details are set forth. However, it is understood that embodiments may be practiced without these specific details. In other instances, well-known materials, structures, and techniques have not been shown in detail in order not to obscure the understanding of this description.

The terms, "for example," "e.g.," "in one/another aspect," "in one/another scenario," "in one/another version," "in some configurations," "in some implementations," "preferably," "usually," "typically," "may," and "optionally," as used herein, are intended to be used to introduce non-limiting embodiments.

Unless expressly stated otherwise, while certain references are made to certain example components, other components may be used as well and/or the example components may be combined into fewer components and/or divided into further components.

Turning now to the drawings, which are included by way of example and not limitation, the present disclosure is directed towards fasteners that provide a rapid, efficient and economical installation of a secure attachment point(s) to the exterior of shipping transport containers without requiring alteration or penetration of the container envelope seal.

Figure 11:
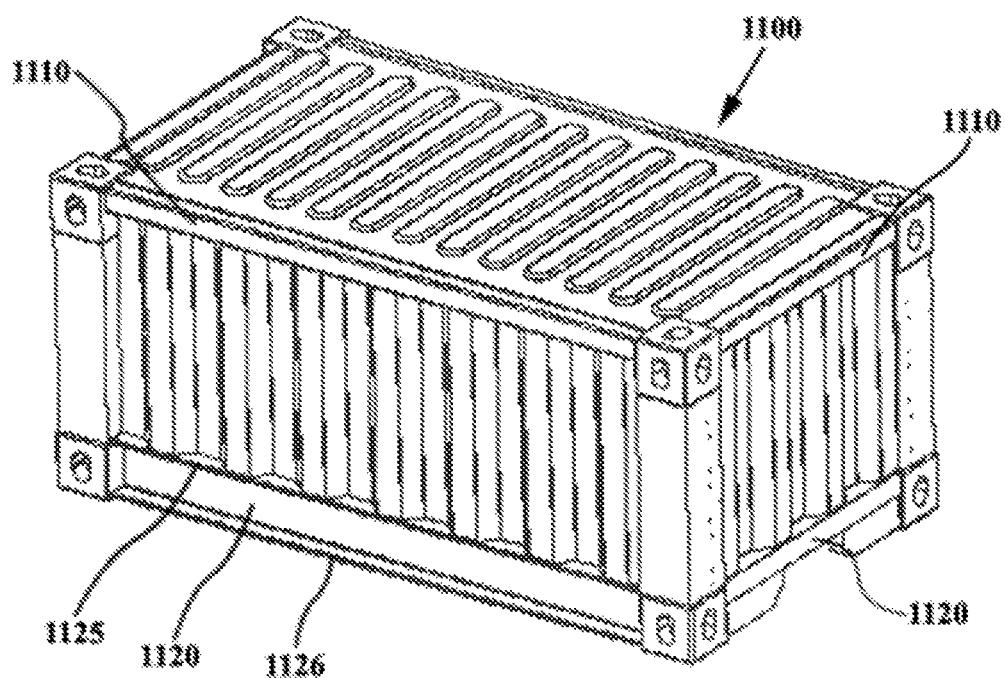
FIG. 11 illustrates a general depiction of a shipping transport container.

FIG. 11 illustrates a general depiction of a shipping transport container (1100) (not to scale). Containers vary in length, height, side wall. corrugation patterns and dimensions as well as top sheet material embossing techniques and patterns. Most transport-by-water containers are 20 or 40 feet in length, 8 feet wide and are approximately either 8 or 9 feet high. Deviations from these norms are more common for by-land-transport containers.

The two variations that relate to this invention are the effective dimension of the upper horizontal 100 structural members (1110) and the gauge—thickness of the flanges (1125,1126) and vertical dimension of the lower horizontal structural members (1120).

Also the flanges (1125 & 1126) on the lower structural members (1120) may not be of equal horizontal depth dimension. These variations only effect the specific fabrication of the fasteners and in no way the general concept or utility of the invention.

The keeper plate (401) is positioned in the box-tube fastener frame (101) by sliding the keeper plate (401) in the keeper plate slot (103) of the box-tube fastener frame (101). Next, place the square nut (601) over the hole (404) of the keeper plate on the side adjacent to the structural member slot (102) of the box-tube fastener frame (101), and structural member slot (102) and inserting the keeper mechanism bolt (501) thru the keeper plate hole (404) and threading the keeper mechanism bolt (501) into the keeper mechanism nut (601) on the opposite side of the keeper plate (401) by rotating the keeper mechanism bolt (501) clockwise to the extent that the conical tip (502) of the bolt (501) minimally protrudes the square nut (601) but not so far as to extend into the structural member slot (0.102).

The keeper plate (401) is positioned in the angle-steel single-flange fastener frame (201) by sliding the keeper plate (401) in the keeper plate slot (203) of the angle-steel single-flange fastener frame (201). Next, place the square nut (601) over the hole (404) of the keeper plate on the side adjacent to the structural member slot (202) of the angle-steel single-flange fastener frame (201), and structural member slot (202) and inserting the keeper mechanism bolt (501) thru the keeper plate hole (404) and threading the keeper mechanism bolt (501) into the keeper mechanism nut (601) on the opposite side of the keeper plate (401) by rotating the keeper bolt (501) clockwise to the extent that the conical tip (502) of the bolt (501) minimally protrudes the square nut (601) but not so far as to extend into the structural member slot (202).

The keeper plates (401) are positioned in the angle-steel dual-flange fastener frame (301) by sliding the keeper plates (401) in the keeper plate slots (303) of the angle-steel dual-flange fastener frame (301). Next, place the square nut (601) over the hole (404) of each of the keeper plates on the side adjacent to the structural member slot (302) of the angle-steel dual-flange fastener frame (301), and structural member slot (302) and inserting the keeper mechanism bolt (501) thru the keeper plate hole (404) and threading the keeper mechanism bolt (501) into the keeper nut (601) on the opposite side of the keeper plate (401) by rotating the keeper bolt (501) clockwise to the extent that the conical tip (502) of the bolt (50.1) minimally protrudes the square nut (601) but not so far as to extend into the structural member slot (302).

Figure 4:
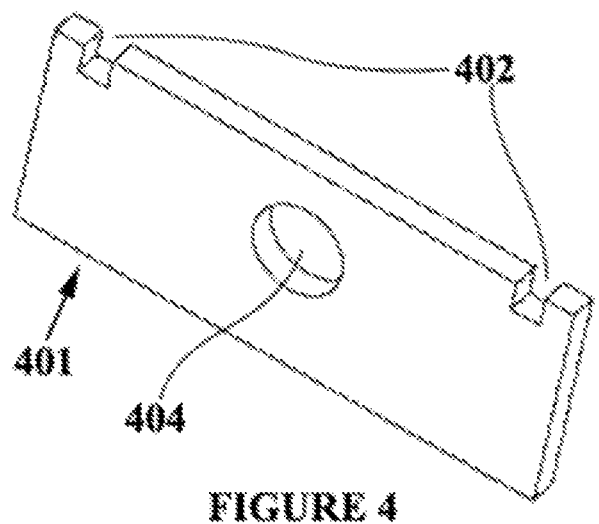
FIG. 4 illustrates the keeper that facilitates the pressure connection between the fastener frame and the container structural members.
Figure 5:
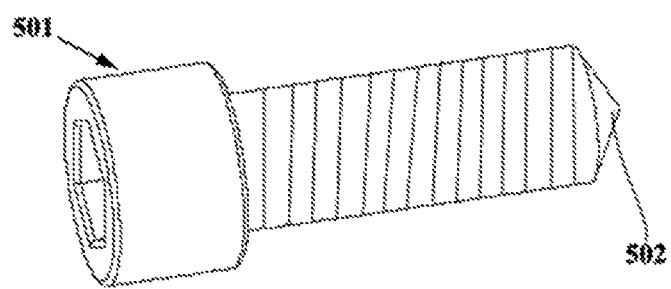
FIG. 5 illustrates the keeper mechanism bolt showing the conical tip.
Figure 6:
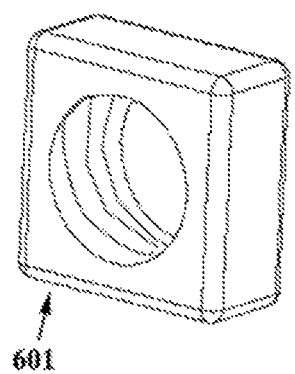
FIG. 6 illustrates the keeper mechanism square nut.

FIGS. 4, 5 and 6 illustrate each of the components of the keeper mechanism un-assembled in the preferred embodiment.

Figure 12:
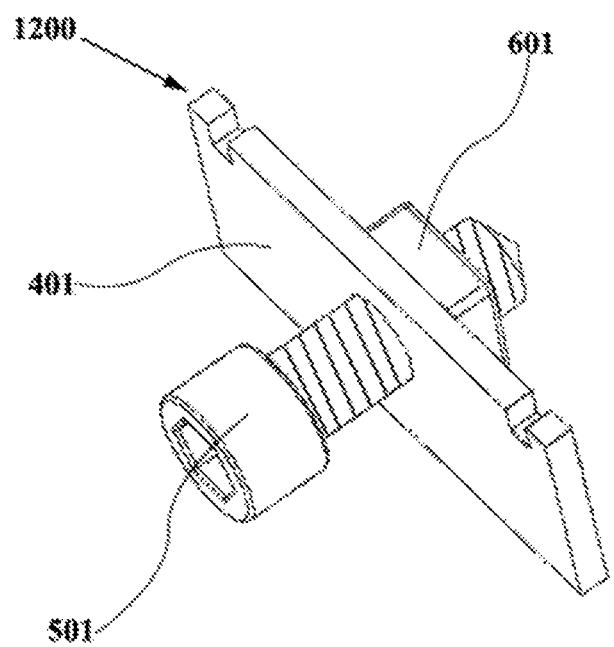
FIG. 12 illustrates the keeper mechanism assembled outside of a fastener frame.

FIG. 12 illustrates the keeper mechanism assembled outside of the fastener frame.

In the preferred embodiment, the keeper mechanism bolt (501) has a conical tip (502) to prevent or limit possible movement of the fastener frame on the structural member (1110, 1125, 1126) as the keeper mechanism bolt (501) is tightened to secure the fastener frame by providing a concentrated contact point rather than the entire diameter of the end of a generic bolt.

In an alternate embodiment, the keeper mechanism bolt (501) could have a ball tip that would be inserted into a swivel pad with either a smooth or serrated contact surface much like a generic C-clamp.

Interlocking slots (402) are cut into the keeper plate (401) to align in the keeper plate in the keeper slots in the box-tube fastener frame (103), single-flange fastener frame (203) and the dual-flange fastener frame (303) to secure the keeper plate (401) in place thus preventing the keeper plate (401) from sliding in the keeper plate's longer dimension direction in the fastener frame keeper slot (103, 203, 303) as well as preventing or limiting possible planer distortion of the keeper plate (401) as the keeper mechanism bolt (501) is tighten and torqued when a fastener frame is being placed and secured on the structural member of the container.

For example, as the keeper mechanism bolt (501) is tightened and torqued securing a fastener frame to the upper structural member (1110) or either of the lower structural member (1120) flanges (1125 & 1126) of the container (1100), the keeper plate (401) could potentially distort from its flat plainer integrity slightly. The inter-locking of the keeper plate (401) to the fastener frame by way of the slots (402) in the keeper plate (401) and the fastener frame slots (103, 203, 303) restrict the tendency of the keeper (401) to pull in-ward and distort from its original flat plane due to the perpendicular force against the keeper plate (401) caused by the tightening and torquing the keeper mechanism bolt (501).

For temporary, semi-permanent and permanent installations, the box-tube fastener frame (110), the single-flange fastener frame (210) and the dual-flange fastener frame (310) are held in place on the container's (1100) upper structural members (1110) and lower structural members (1120) by way of a pressure connection using the keeper mechanism (1200).

The box-tube fastener frame (110) used on the upper structural member (1110) in cases when the transport container upper structural member is constructed of box-tube and the single-flange fastener frame (210) used on the upper structural member (1110) in cases when the transport container is constructed of angle-steel are further secured in position by the locking action of the fastener device locking cross-rail (703) by insertion of the fastener device locking cross-rail (703) from the top into both of the fastener frames and then pinning the fastener device locking cross-rail (703) and the fasteners frames (101 or 201) together in-place by a locking mechanism such as a bolt (704) or other suitable means.

Figure 7A:
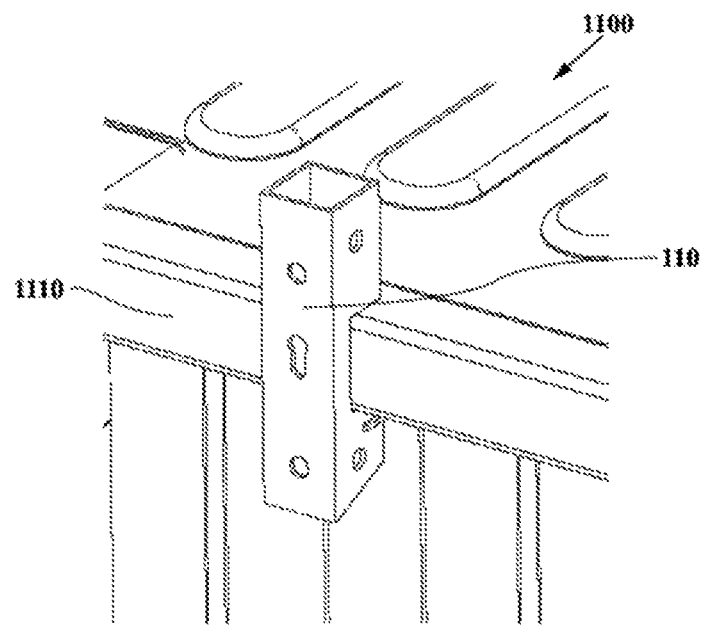
FIG. 7A illustrates the upper box-tube fastener frame positioned with the fastener frame's structural member slot around the upper box-tube structural member.
Figure 7B:
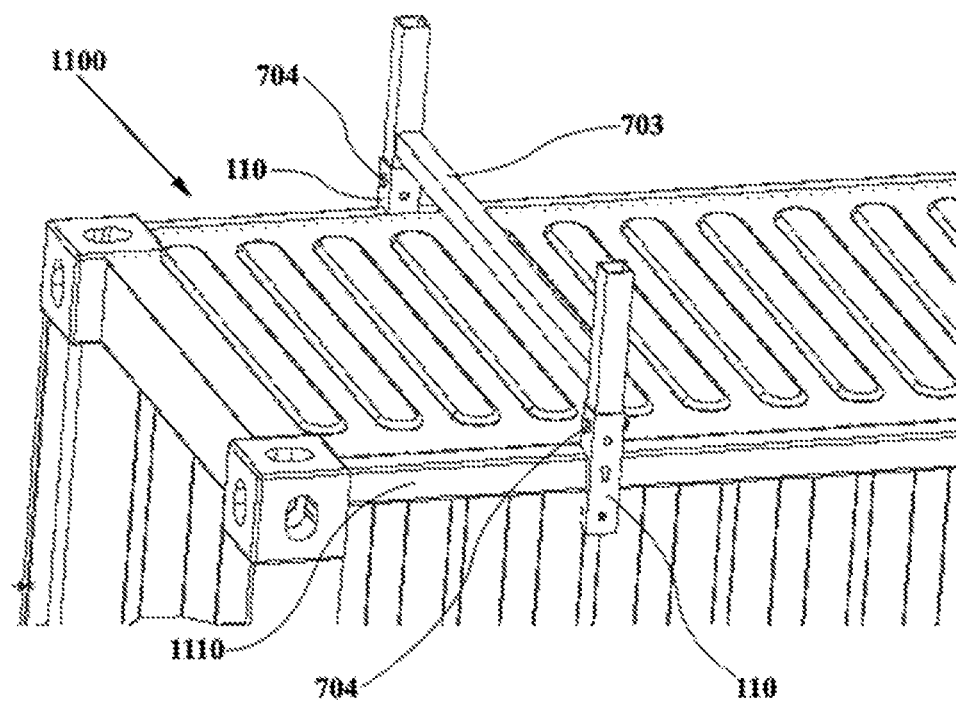
FIG. 7B illustrates two of the upper box-tube fastener frames positioned, secured and locked in place by way of the fastener device locking cross-rail.
Figure 8:
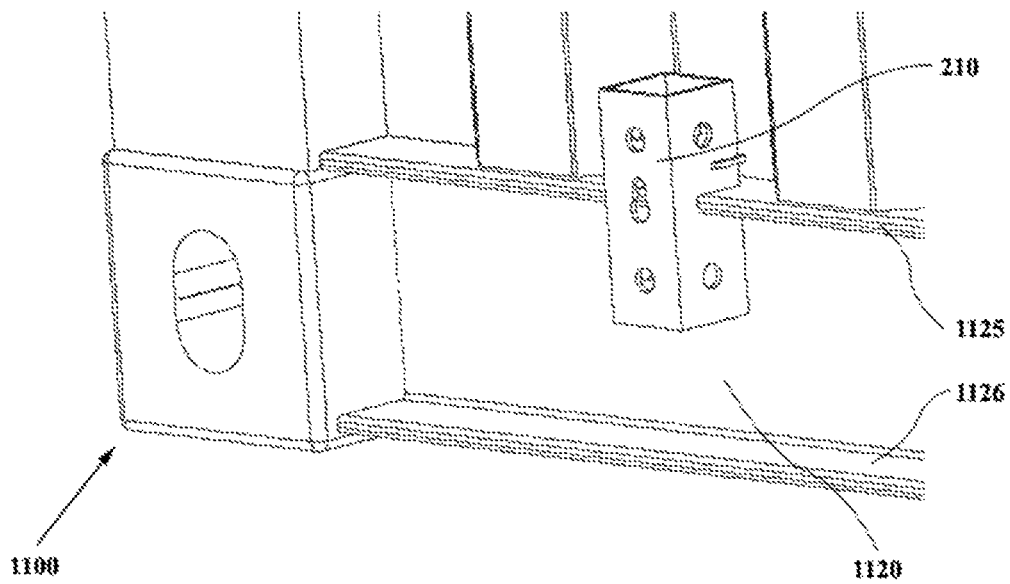
FIG. 8 illustrates the installation of the lower single-flange fastener frame.
Figure 9:
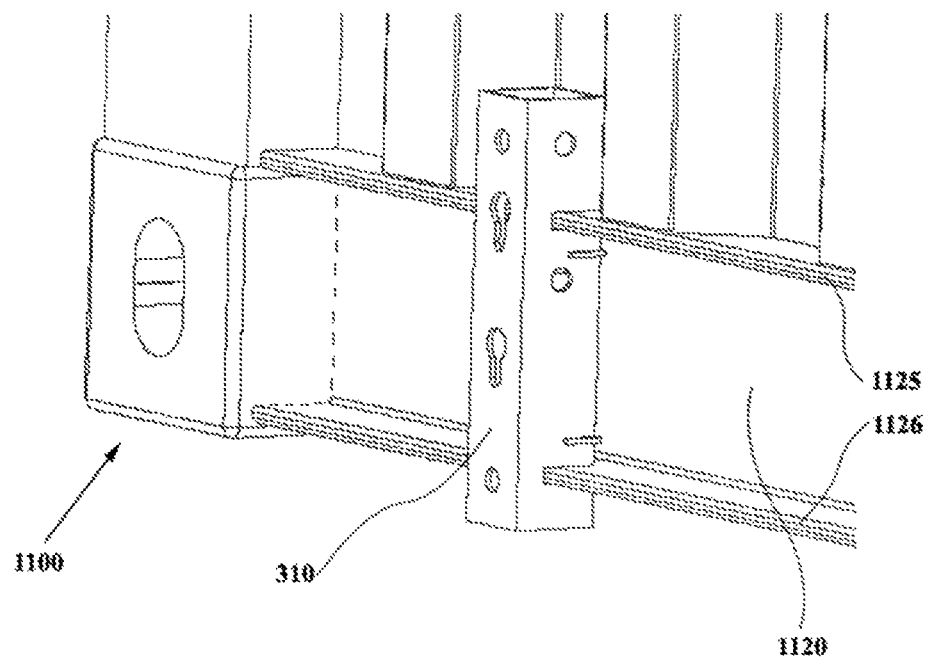
FIG. 9 illustrates the installation of the lower two-flange fastener frame.
Figure 10:
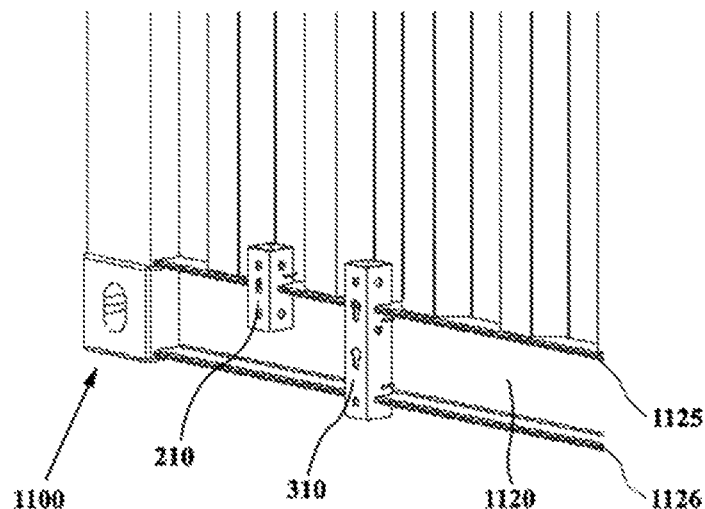
FIG. 10 illustrates the installation of both the single and dual-flange fastener frame installed on the lower structural member positioned on the container lower structural member.

The locking cross-rail (703) can be a simple rail fabricated to be inserted into the fasteners as illustrated in FIG. 7B, or they can be integral to the fixture racking. For example, but not limited to, the locking cross-rail (703) might be incorporated into the racking system of a Photo Voltaic (PV) solar panels or thermal solar thermo-syphoning tank support and solar collector mount, or a signage mount, luminaire standard or antenna mast.

The lower structural member fasteners could be a single-flange fastener frame (201) installed on one flange (1125 or 1126) or span both flanges (1125 & 1126) of the lower container structural member (1120) using the dual-flange fastener frame (301) and might incorporate a keeper mechanism (1200) for one or both flanges.

Furthermore, in some and alternate embodiments the fastener frames may be varying in the numbers, locations and types of holes (104), key-slots (105) etc. or other perforations and augmentations to facilitate the connection methods of the fixture(s) to the fastener frames (101, 201, 301). For example, a short length of tubing—may be equal to the width of the fastener could be welded to the outside face of the fastener frame horizontally to accept a full length smaller tube that might be part of or facilitate the attachment of an awning or like fixture to the side of the transport container.

In another embodiment, the invention could be used for the purposes of prototyping a configuration for the attached fixtures that will be replicated once the precise positions are known. The initial installation would use the fastener frame(s) described above while the final implementation might use an alternate embodiment of the fastener absent of the keeper mechanism (1200) which would then be welded in place or simply held in place by the locking action of the locking cross-rail (703) of the design in. the case of the box-tube fastener frame (110) or single-flange fastener frame (210).

In an alternate embodiment, the invention, the keeper plate might be a thicker gauge metal that could be threaded to accept the keeper bolt directly thus eliminating the necessity of the square nut (601) between the keeper plate (401) and the upper structural member (1110) and the flanges (1125 & 1126) on the lower structural member (1120) that facilitates the pressure connection.

In an alternate embodiment, the keeper plate might utilize two or more keeper bolts to facilitate the pressure connection of the fastener frames (101, 201, and 301) to the structural members (1110) and flanges (1125, 1126).

Figure 1A:
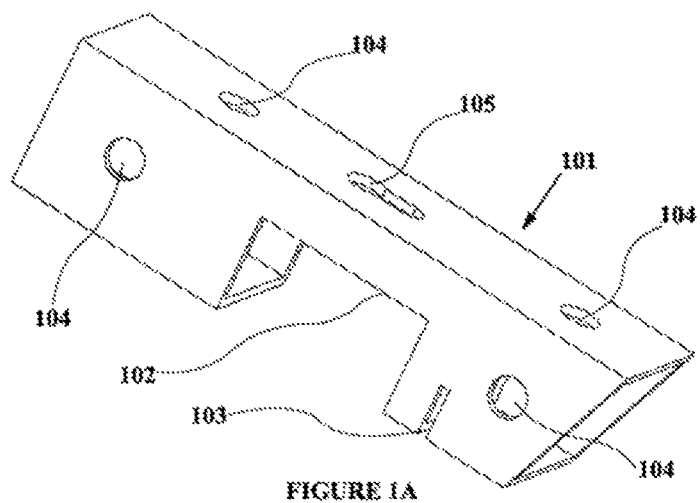
FIG. 1A illustrates the preferred embodiment of the box-tube structural member fastener frame—perspective 1.
Figure 1B:
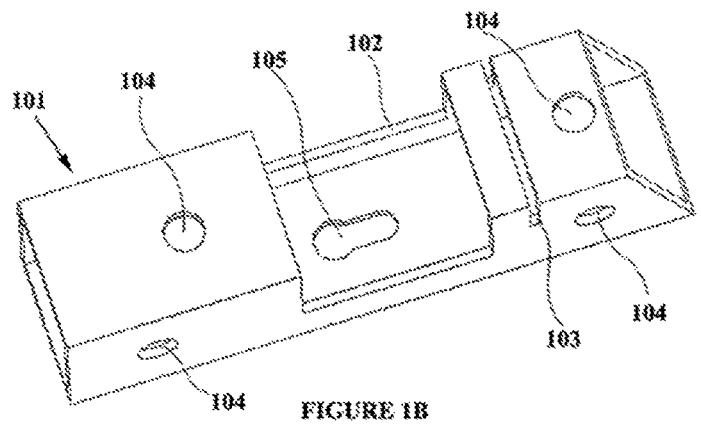
FIG. 1B illustrates the preferred embodiment of the box-tube structural member fastener frame—perspective 2.
Figure 1C:
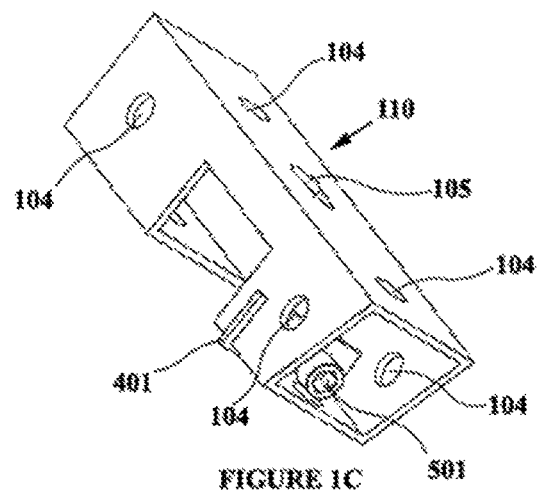
FIG. 1C illustrates the preferred embodiment of the box-tube structural member fastener frame assembled with the keeper mechanism in-place and ready for installation.
Figure 2A:
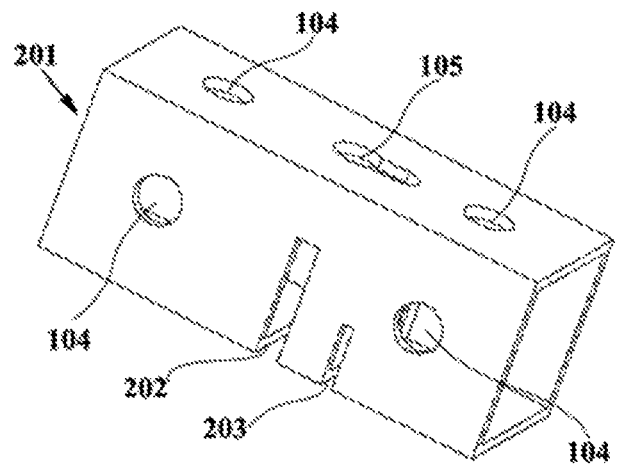
FIG. 2A illustrates the preferred embodiment of the angle-steel single-flange structural member fastener frame—perspective 1.
Figure 2B:
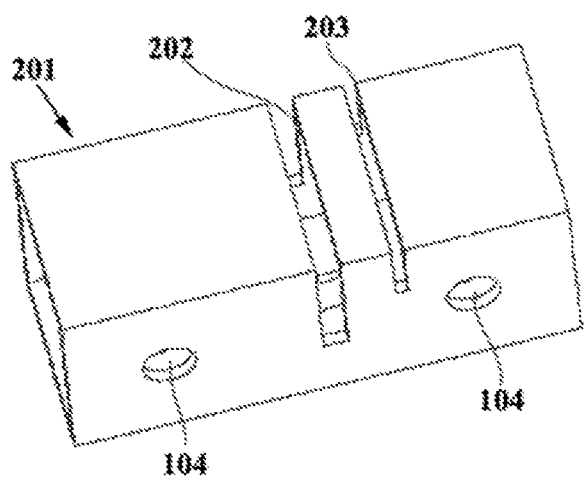
FIG. 2B illustrates the preferred embodiment of the angle-steel single-flange structural member fastener frame—perspective 2.
Figure 2C:
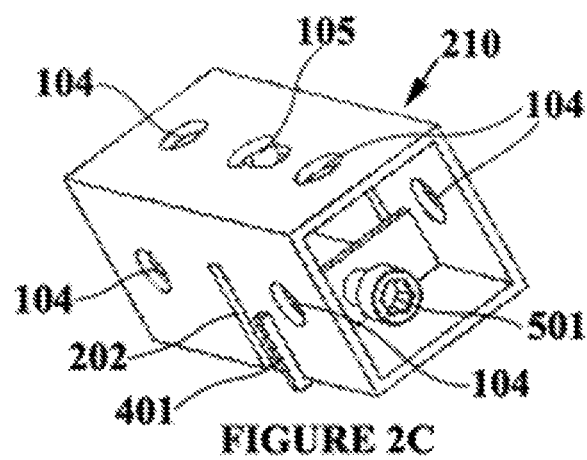
FIG. 2C illustrates the preferred embodiment of the angle-steel single-flange structural member fastener frame assembled with the keeper mechanism in-place and ready for installation.
Figure 3A:
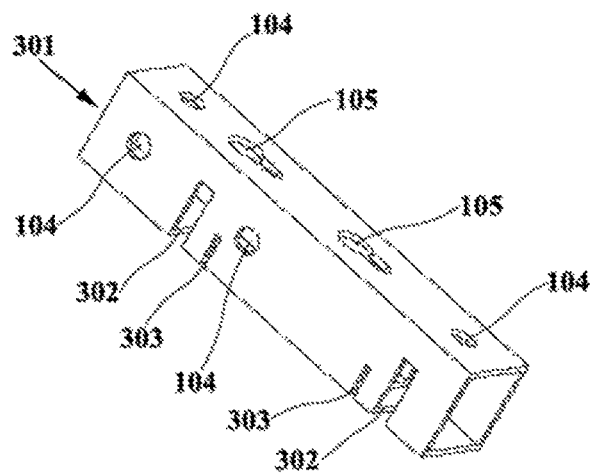
FIG. 3A illustrates the preferred embodiment of the dual-flange structural member fastener frame—perspective 1.
Figure 3B:
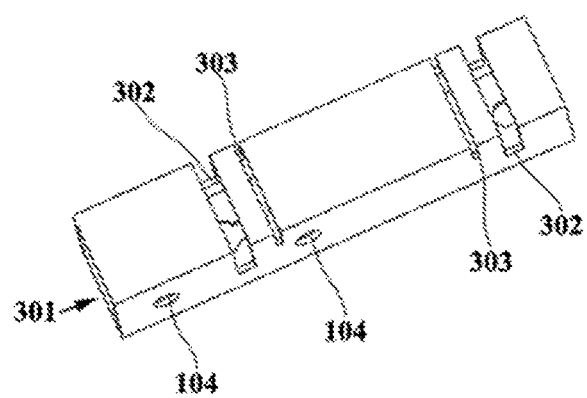
FIG. 3B illustrates the preferred embodiment of the dual-flange structural member fastener frame—perspective 2.
Figure 3C:
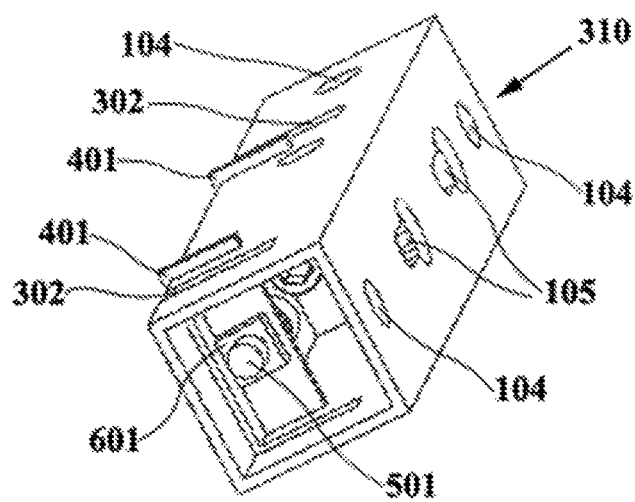
FIG. 3C illustrates the preferred embodiment of the dual-flange structural member fastener frame assembled with the keeper mechanisms in-place and ready for installation.

In an alternate embodiment, the lower structural member dual-flange fastener frame (301) might have the keeper plate (401) on the opposite side of the flange structural slot (203) as depicted in FIG. 3A and therefore access to the keeper mechanism bolts (501) would be from the upper and lower ends rather than through a center hole or slot in the fastener frame positioned between the lower structural member (1120) channel flanges (1126 & 1125).

Having the keepers plates (401) positioned between the lower structural member (1120) channel flanges (1125 & 1126) and providing access to the keeper mechanism bolts (501) from via a center hole or slot in the fastener frame could add a level of tampering security to the installation by restricting access to the keeper mechanism bolts (501) once the fixture being attached is installed.

In an alternate embodiment, the keeper mechanism bolt (501) might be a common standard hexagonal head machine bolt or similar; or be of reverse thread direction in concert with a reverse thread square nut (601).

In an alternate embodiment, the keeper mechanism bolt (501) might not have the conical tip (502).

It will be apparent from the foregoing that, while particular forms of the disclosure have been illustrated and described, various modifications can be made without parting from the spirit and scope of the disclosure.

Furthermore, the various embodiments described above are provided by way of illustration only and should not be construed to limit the invention. For example, the fastener frames illustrated are fabricated out of steel box tubing. They might be fabricated out of rectangular tubing, U-channel or angle steel or respective aluminum materials. Those skilled in the art will readily recognize various modifications and changes that may be made to the disclosed invention without following the example embodiments and applications illustrated and described herein.

The invention claimed is:

1. A fastening system for securing fixtures to an exterior side or top of an ocean container, comprising:
a tube including an elongated notch laterally extending from a tube edge and through a face of said tube and at least partially encircling a structural member of the ocean container; an elongated slot extending from the tube edge and into the tube face such that it is adjacent to and parallel with said notch; a clamping mechanism including a generally rectangular keeper plate with a hole on one keeper plate face which receives a threaded bolt and nut assembly therethrough; the slot receives portions of the keeper plate therein; and a plurality of holes on a face of the tube, wherein the holes are configured to attach a locking cross-rail to the tube or attach a fixture to the container.

* * * * *